July 24, 1962  E. L. BOWMAN  3,046,175
METHOD OF STABLE MASKING HONEYCOMB CORE
Filed March 1, 1960  3 Sheets-Sheet 1
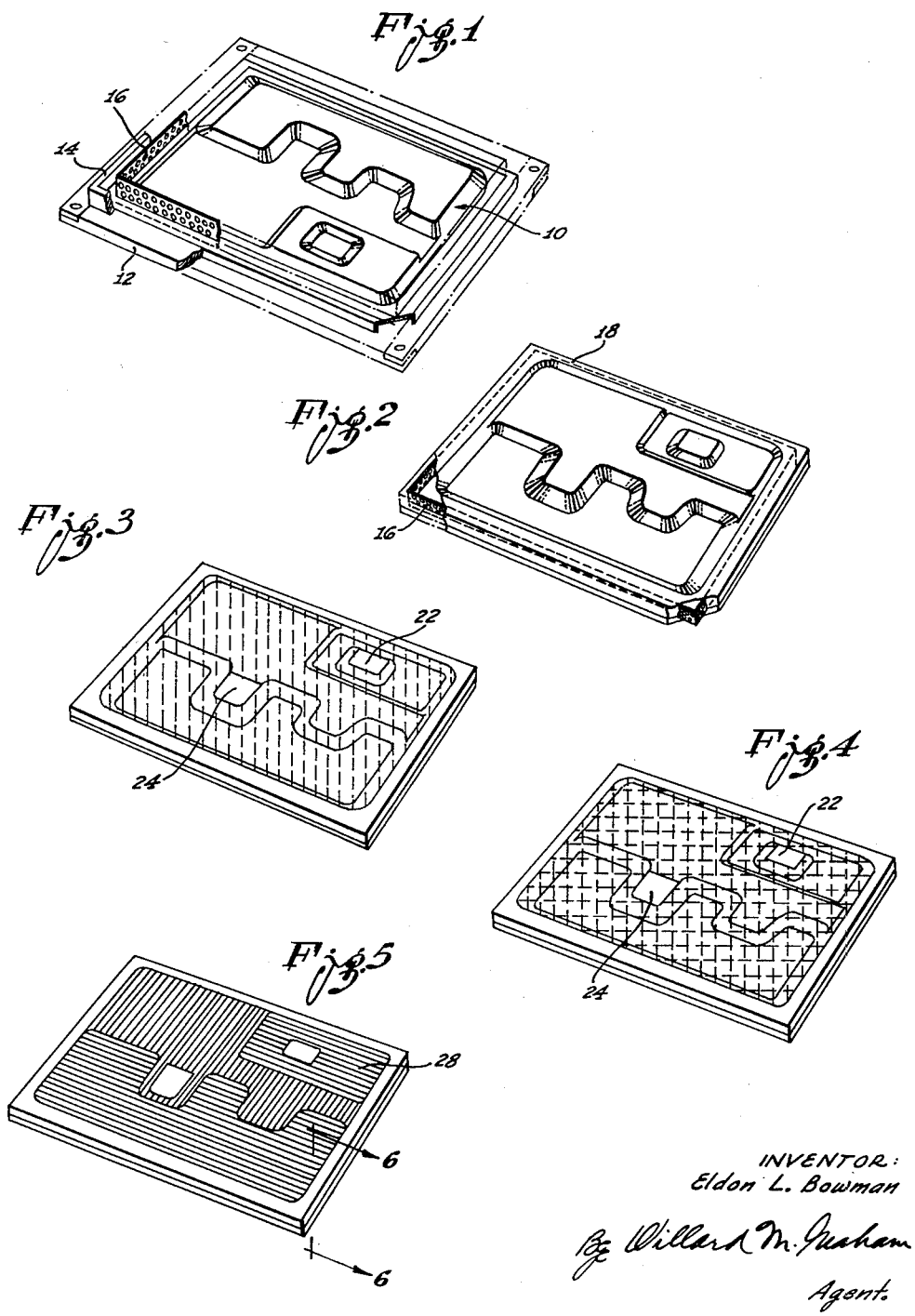
INVENTOR:
Eldon L. Bowman

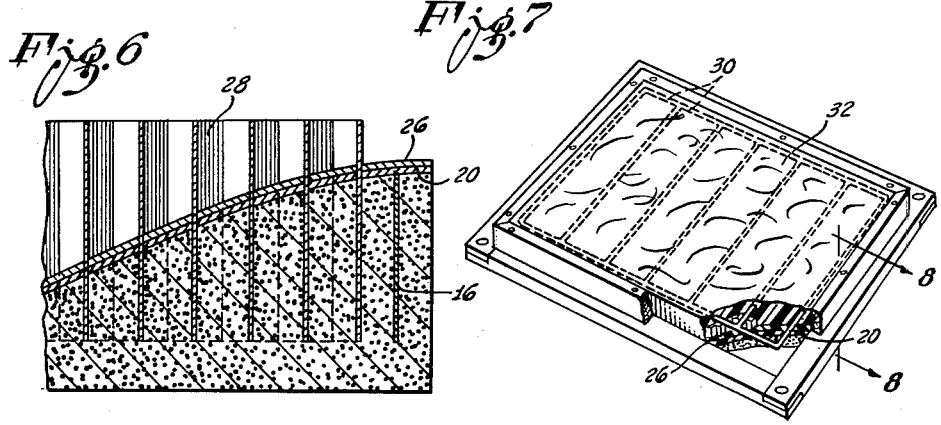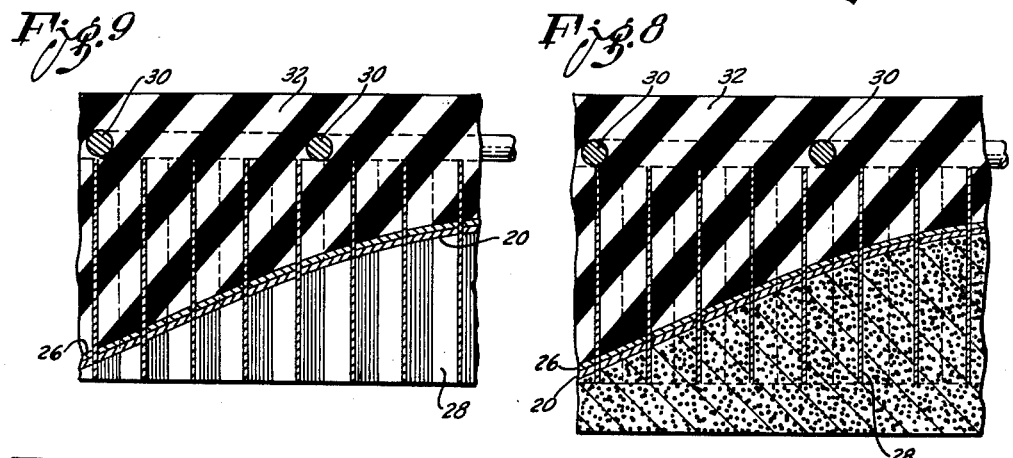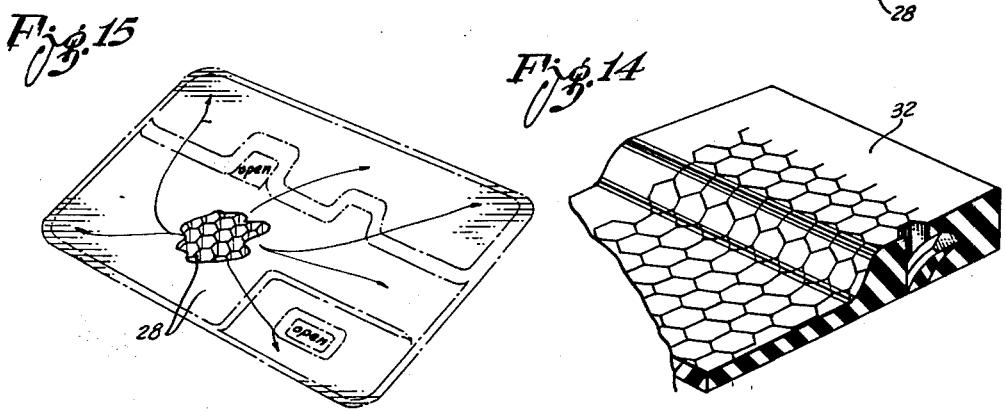

July 24, 1962 E. L. BOWMAN 3,046,175
METHOD OF STABLE MASKING HONEYCOMB CORE
Filed March 1, 1960 3 Sheets-Sheet 3
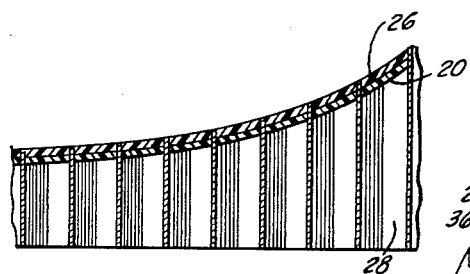
Fig. 10
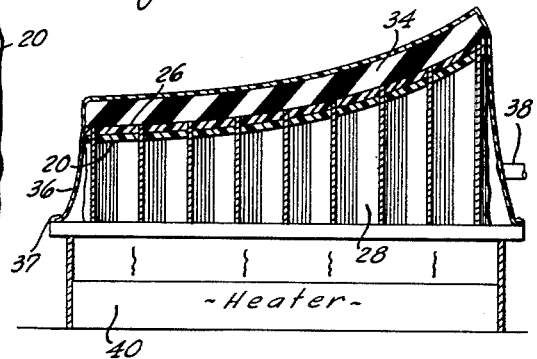
Fig. 11
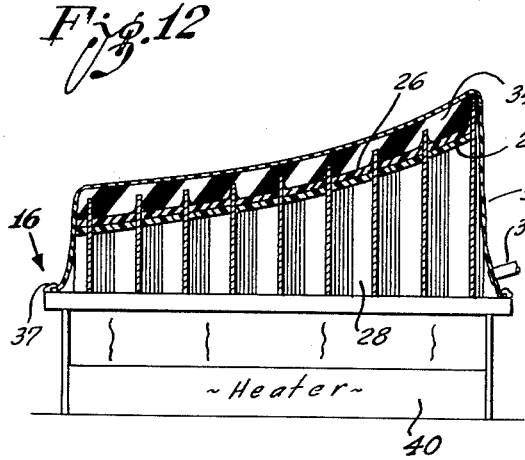
Fig. 12
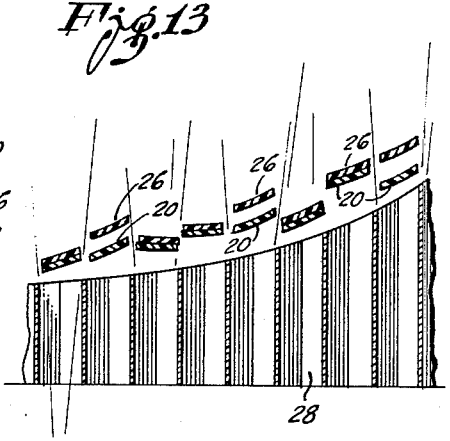
Fig. 13
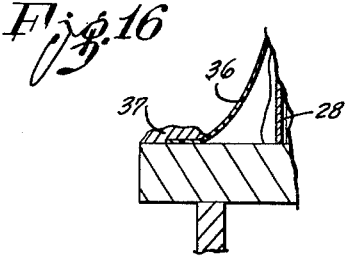
Fig. 16
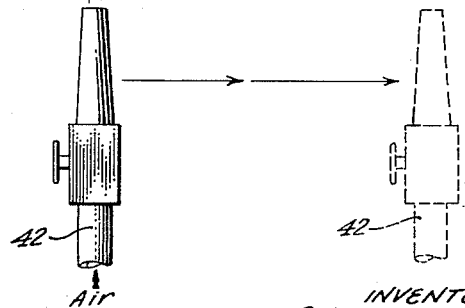
INVENTOR:
Eldon L. Bowman
By Dillard M. Graham
Agent.

United States Patent Office 3,046,175
Patented July 24, 1962

3,046,175
METHOD OF STABLE MASKING
HONEYCOMB CORE
Eldon L. Bowman, Redondo Beach, Calif., assignor to Northrop Corporation, Beverly Hills, Calif., a corporation of California
Filed Mar. 1, 1960, Ser. No. 12,033
5 Claims. (Cl. 156—11)

This invention has to do with a method for contouring a cellular material such as a metal honeycomb object. Also, this is a continuation-in-part of application bearing Serial No. 768,800, filed October 21, 1958, by Eldon L. Bowman, now U.S. Patent No. 2,981,612.

Contouring, shaping, and the mere cutting of honeycomb material provide very peculiar problems. The reason being that the material is essentially a "flabby" or unstable accordion-type structure. It has been extremely difficult, if not impossible, to provide honeycomb core that has, in combination, acute compound curves, feathered or very fine tapered edges, depressions, and openings located closely adjacent the curves.

Simple (mono-directional) forming can be done rather easily. The common technique being to use a bending brake or equally applicable equipment. Lack of ductility of the honeycomb structure and plasticity in the adhesive bond for the honeycomb make it difficult to form the material by physical strain. Thus, the degree of forming is limited to that attainable by cell distortion, and varies with cell shape and size. In compound-curvature forming, this is a particular problem.

Expanded metal honeycomb is obviously a difficult material to hold for machining faces without crushing or burring the cell walls, and the problem is magnified as foil thickness is reduced. But, when honeycomb core material is expanded, some holding—and often stabilizing—method or methods is required.

Many forms of equipment and tooling, particularly designed for honeycomb core work, have been tested, some of which have been adopted. None have been able to provide acute compound curves, feathered edges, and openings within or adjacent certain areas.

An object of this invention is to provide a method of contouring cellular materials and provide acute compound curves, openings in or adjacent certain areas, and tapered or feathered edges, all to extremely accurate tolerances.

Another object of this invention is to provide a method of contouring cellular materials whereby the chemical substances used are relatively inexpensive, readily available, and some, after use, are recoverable.

A yet further object of this invention is to provide a method of contouring cellular materials whereby the process may be carried out with a minimum amount of skilled supervision while at the same time obtaining maximum satisfactory results.

Briefly, the invention comprises preparing a contoured, edge reinforced, mold which may be prepared from a master pattern. Preferably, a rubber-like coating material or mask as well as a release and a secondary seal or mask composition is applied and cured to the contoured surface of the mold, in order to add strength to the mold material as well as provide a chemical mask for the honeycomb core. The honeycomb structure, preferably in sheet form, is inserted through the coating into the mold to the desired depth. The exposed portions of the cells of the honeycomb, over which a frame is placed, are protected by a core stabilizing material, preferably by filling the cells with a hot melt composition. The mold is removed from the honeycomb structure, such as by disintegrating the mold material in water or other liquid. The honeycomb structure is placed in a chemical etching bath or tank until the exposed core material is removed. This gives a contoured structure. The masking material and coating material may then be removed, such as by using a vacuum bag process and by mechanically stripping, respectively.

FIGURE 1 is a perspective view, illustrating a master pattern used in the process.

FIGURE 2 is a perspective view, illustrating an edge reinforced mold made from the master pattern.

FIGURE 3 is a perspective view, illustrating the mold with a lining or coating material, in the form of a mask, applied thereto.

FIGURE 4 is a perspective view, illustrating the mold with a second composition that is in the form of a secondary mask and release agent.

FIGURE 5 is a perspective view, illustrating the honeycomb material as applied to the mold.

FIGURE 6 is an enlarged, cross-sectional view taken on line 6—6 of FIGURE 5, looking in the direction indicated.

FIGURE 7 is a fragmentary perspective view, illustrating the procedure for applying a stabilizing material to the honeycomb core.

FIGURE 8 is an enlarged, cross-sectional view taken on line 8—8 of FIGURE 7, looking in the direction indicated.

FIGURE 9 is a view similar to FIGURE 8 but illustrating the mold material removed.

FIGURE 10 is an enlarged view illustrating the honeycomb core material after etching or chemical milling with masking and release material and composition in place, and with stabilizing hot melt removed.

FIGURE 11 is an enlarged view showing the chemically milled material in a vacuum bag prior to removal of the masking material.

FIGURE 12 is an enlarged view illustrating the displacement of the masking material.

FIGURE 13 is an enlarged view illustrating the removal of the displaced masking material.

FIGURE 14 is a view illustrating the hot melt material or compound as it is removed from the honeycomb core.

FIGURE 15 is a perspective view, illustrating the contoured and completed panel of honeycomb core material.

FIGURE 16 is a magnified view taken from the area identified by numeral 16 in FIGURE 12.

Referring to the drawings for a more detailed description of the present invention, 10 broadly designates a master pattern having compound curves, tapered or feathered edges and the like, as may be determined by referring to FIGURE 1. The pattern per se is placed within a breakaway frame 12 having side rails 14. Between the rails and the pattern and defining the latter is a perforated member 16 that has for its purpose the reinforcing of the edges of the mold illustrated in FIGURE 2. It is virtually impossible to machine, in any way, the curves and depressions because of their location and form characteristics. Many structures include such panels as represented by the master pattern shown. It is to be understood that the illustrated pattern 10 is merely representative of innumerable configurations that may be shown.

The frame 12 and rails 14 function as a container or retainer for the preparation of the mold and also function as a means for surfacing the base of the mold and provide a predetermined mold thickness.

A disposable release material or agent, polyethylene film, can be applied to the master pattern by the well known vacuum bag method. This procedure is adopted for the reason that the sharp corners and depressions must be well defined in order that an accurate mold may be obtained. Obviously, other release agents, such as paraffin wax, may also be applied. Likewise the release agent can be omitted, but without it there is difficulty of obtaining release for some contours.

The master pattern, preferably with the release agent therein, is then coated or covered with a readily removable material, such as plaster, which after drying can be disintegrated in water. A suitable composition consists of talc and a combination of 20–80 parts talc and breakaway plaster. These are thoroughly mixed dry until no lumps are present. The optimum combination is 30 parts talc and 70 parts breakaway plaster. The above mixed ingredients are added to 100–150 parts of water, 130 parts being optimum. The materials are thoroughly mixed together, powder to water, to prevent the formation of lumps and provide a slurry. The slurry is poured into and over the pattern until the retainer frame 14 is filled and the upper exposed surface of the slurry, when dry, will provide a flat surface. The slurry is to set in the pattern, at room temperature for 15–45 minutes, 30 minutes being optimum. The slurry, although still retaining some water, sets up solid in the time stated to provide a plaster mold 18, FIGURE 2, that is very weak and readily disintegrated in water. Likewise plastics containing a water soluble binding agent can be used. Various other mold materials may be used, but preferably the mold formed should be porous or otherwise compressible in order to avoid distortion.

After the material has become solid the frame 12, rails 14, release agent, and the mold 18 are removed from the pattern 10. The mold is, of course, a negative of the pattern 10 and the edge reinforcement 16 is retained embedded in the mold.

The plaster mold 18 of the composition described is dried in an oven for 3–24 hours at a temperature between 120° F. and 250° F. In the completely dry state, the mold is very porous and very smooth and additional strength is obtained. The porosity of the mold is minute and for all intents and purposes not visible to the unaided eye. If the mold is dried at a temperature above 250° F., destructive checking and cracking may occur.

Following the complete drying of the mold 18, a liquid masking or lining material 20 is preferably applied. However, those areas, 22 and 24, which define openings, in the final product, may not be covered, FIGURES 3 and 4. Extreme care is exercised to assure the proper application of the lining, masking or coating material 20. The masking consists of 90–110 parts of a plastisol, such as a rubber latex containing sulfur or other vulcanizer, 10–30 parts of an inert filler, such as silica flour, and 0.5–1 part of coloring material. The optimum amounts of the materials are 100 parts of plastisol, 20 parts filler, and preferably 0.5 part of coloring material, such as lamp black. These materials are thoroughly mixed together and brushed on, or otherwise applied, to the mold in the areas previously mentioned. Addition of the coloring material is optional and need not be used if not desired.

The mold preferably with the coating, masking, or lining applied is then heated to about 180° F. for 15 to 30 minutes or until the coating, masking, or lining jells, but is not completely cured. However, the same process can occur at room temperature or any temperature between that of the room and 180° F. The partial curing takes longer at temperatures below 180° F.

The coating, masking, or lining, as applied to the mold, is not to be over 1/8" thick and 1/16" is preferred. The masking in the partially cured condition has very little elastic strength and, as a result, can be easily cut with a relatively sharp edge.

Another application of a release and secondary mask composition 26 is applied to the masking material 20. The secondary mask and release composition consists of 1–3 parts cellulose acetate butyrate dissolved in 3–6 parts trichlorethylene; 1 part of the former to 4 parts of the latter being optimum. Aluminum powder in the amount of 5% is added to the above composition. The aluminum powder is not just added for pigment purposes. It does increase the masking and release properties of the composition. Three or four coats of the release composition is applied to the masking material 20. The thickness of the composition 26 should be approximately .005 inch thick. This composition 26 not only prevents adhesion or sticking during the latter operations, but also helps to ensure a good seal of the mask 20 in the honeycomb cells.

The next step in the method is to place the mold 18 in a press and a sheet of honeycomb material 28, of the desired density and cell size, is placed over the mold. The press, very accurately controlled, is lowered and the core is forced through the masking material 20, release agent 26, if present, into the mold 18 to the proper depth, FIGURES 5 and 6. An insertion rate of about .032" per minute is satisfactory. All of the honeycomb material 28 in some instances may be urged into the mold 18. That part of the honeycomb material entirely forced into the mold provides for the openings. In other words, the shape of the mold will determine the location of the openings. Small quantities of distilled water, which functions as a lubricant, may be applied to the honeycomb material. The excess masking materials 20 and 26 are carefully trimmed or removed from the mold.

After the honeycomb material 28 is urged into the mold 18, the entire assembly is placed in an oven maintained at a temperature of 250° F. to 350° F., the optimum being 300° F. At the temperature specified, the coating or lining material 20 completely cures, flows slightly, seals the cuts made by the honeycomb material 28 and lightly bonds to the exposed honeycomb material. The curing time for the masking material 20 is 25 to 45 minutes, and preferably 30 minutes. In the cured state, the masking material becomes elastic.

Again the frame 12 and rails 14 are placed about the mold 18. A wire rod frame or grid 30, illustrated in dotted lines and having substantially the same peripheral configuration as the mold 18, is placed over that portion of the honeycomb core opposite to the mold. The frame among its other functions supports the assembly in the chemical etchant bath. A hot melt sealant 32 is prepared, and poured into and over the exposed core cells and onto the secondary mask and release agent 26 in the manner illustrated in FIGURES 7 and 8. It is very important that all cells of the honeycomb core 28 be filled completely. The hot melt 32 preferably consists of about 60 percent viny resin (copolymer of vinyl acetate or vinyl chloride) and 40 percent dioctyl phthalate.

The proceure for preparing and pouring the hot melt 32 is as follows: While the masking material 20 is in the oven being cured, the hot melt is being prepared. When the cured masking material 20 is removed from the oven and before it has cooled, the hot melt is poured in the manner previously described. The open cells of the honeycomb material 28 are completely covered. The hot melt is permitted to cool at room temperature. In the cooled state, the hot melt material 32 is elastic.

After the hot melt is completely cooled, the plaster mod 18, which is disintegrable by water, is washed away by exposing the same to fine jets of hot water. The masking material 20, the release composition 26, the honeycomb material 28 and the hot melt 32 are not water soluble. Once the plaster mold material 18 is removed, a structure such as seen in FIGURE 9 is obtained. Again, it is important that all the mold material be removed for the reason that any residue will function as a maskant and will restrict the chemical milling in that area.

It is to be noted that the cells of the honeycomb material 28 which were embedded in the mold 18 are now completely exposed.

The honeycomb material 28, as it is seen in FIGURE 9, is supported by the wire rod frame 30 in an etch tank preferably containing nitric, hydrochloric, and phosphoric acid. The exposed core cells are placed in the etchant tank in the up position. A sodium hydroxide solution may be substituted for the preceding when the core is aluminum. Other etchant solutions will be used for other metals and materials. The solution in the tank, maintained at 150° F., dissolves the exposed honeycomb material 28 in a very short time. The concentration of the etch solution, the cell, and core size determine the dissolving time. However, the masking material 20, being elastic and bonded to the core cell walls will stop the chemical action of the etching solution. In other words, the masking material 20 will expand over the cell walls of the honeycomb material 28 to stop the dissolving action.

After all the desired honeycomb material 28 is removed, the now shaped honeycomb material 28, the masking 20, the release composition 26, and the hot melt 32 are removed from the tank and washed clean with water.

FIGURE 9 shows the shaped honeycomb core 28 with the coating, masking or lining 20 and the hot melt material 32 in place.

The hot melt 32 and the masking material 20, which adhered to the hot melt during the pouring of the latter, are removed from the honeycomb core 28 and preferably reclaimed to be used again.

The hot melt 32 is mechanically removed from the honeycomb core 28 by the use of hands or by some mechanical device and appears in the manner seen in FIGURE 14. When this is done the honeycomb core 28, the masking material 20 and the release composition or secondary mask 26 appear in the manner as seen in FIGURE 10.

The panel of chemically milled honeycomb core 28 is inverted in the manner illustrated in FIGURES 10 and 11. A pad or panel of low melting point rubber 34 is placed over the etched panel. A sheet of plastic 36 is placed over the pad 34, the etched core 28, masking 20 and release agent 26 with the pad 34 being in contacting relation with the mask 20. The sheet of plastic, with a putty like substance 37 distributed about the edges to provide a seal, FIGURE 16, provides, in effect, a bag. A source of vacuum 38 is inserted into the bag and as complete a vacuum as is possible to obtain is applied in order that a positive pressure outside the bag may be applied to the pad 34.

Then the vacuum bag and chemically milled panel of honeycomb core 28 are placed over a heater 40 or into a furnace. The temperature is raised to 175° F. to 200° F. or until heat begins to cause the masking 20 and release agent 26 plugs to soften. Also the pad 34 begins to flow. With the vacuum applied the pad 34 is urged into the honeycomb core cells and breaks the masking material and release agent loose from their adhesive attachment to the cell walls in the manner illustrated in FIGURE 13.

When the release from the cell walls occurs, the assembly is removed from the heat, vacuum is released and a jet of air represented by air hose nozzles 42 is directed into the cells to urge or force the masking material 20 and release agent 26 therefrom.

Other positive pressure procedures may also be adopted. However, the vacuum bag process defined appears to be the most practical at this time.

The final chemically milled panel 28 will have the configuration illustrated in FIGURE 15 which is the shape of the mold illustrated in FIGURE 1.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

I claim:
1. The method of chemical milling a honeycomb structure which comprises preparing an edge reinforced contoured mold; inserting said honeycomb structure through a coating material and a release composition and into said mold; applying a hot melt sealant to the exposed surfaces of the honeycomb structure; removing the mold from the honeycomb; etching away the honeycomb material unprotected by the coating material; manually removing said hot melt sealant from said honeycomb structure; placing a sheet of deformable material over the etched surface of said honeycomb structure; applying pressure to said sheet causing portions of the latter to enter the openings in said honeycomb structure whereby said coating material and release composition are loosened from said honeycomb structure and subsequently removing the loosened portions of said coating material and release composition from said honeycomb structure.

2. The method of claim 1, wherein the honeycomb structure is an expanded metal sheet and wherein the exposed cells of the honeycomb structure are filled with masking material.

3. The method of claim 2, wherein the surface of the mold is coated with a plastisol prior to inserting the honeycomb structure.

4. The method of chemical milling honeycomb core, comprising applying an edge reinforced settable mold material to a prepared pattern; removing the pattern and setting the mold material; applying and partially curing a curable coating material on said mold; applying a secondary mask and release composition to said coating material; inserting a honeycomb material into the coating material and release composition and mold to the desired depth; curing the coating material; applying hot melt material on the mold to fill the exposed cells of honeycomb material; removing the mold from the honeycomb material; inserting the honeycomb material into a chemical etching material until exposed honeycomb material cells have been removed; manually removing the melt material from said honeycomb core, placing a sheet of deformable material over the etched surface of said honeycomb core, inclosing said honeycomb core and deformable sheet in a vacuum bag, evacuating said bag thus allowing atmospheric pressure to act on said sheet causing portions of the latter to enter the cells of said honeycomb core functioning to dislodge said coating material and secondary mask and release composition from said honeycomb core and subsequently removing the dislodged portions of said coating material and secondary mask and release composition from said honeycomb core.

5. The method of chemical milling honeycomb core, comprising applying an edge reinforced mold material to a prepared pattern; removing the pattern and curing the mold material; applying and partially curing a rubber material on said mold; applying a secondary mask and release composition to said material; inserting honeycomb core into the composition and rubber material and mold to the desired depth; completely curing the rubber material; applying hot melt material on the mold to fill the exposed cells of honeycomb core; removing the mold from the honeycomb core; inserting the core into a chemical etching material until exposed honeycomb core cells have been removed; manually removing the melt material from said honeycomb core, placing a sheet of deformable material over the etched surface of said honeycomb core, inclosing said honeycomb core and deformable sheet in a vacuum bag, evacuating said bag thus allowing atmospheric pressure to act on said sheet causing portions to enter the cells of said honeycomb core functioning to dislodge said rubber material and secondary mask and release composition from said honeycomb core and subsequently removing the dislodged portions of said rubber material and secondary mask and release composition from said honeycomb core.

References Cited in the file of this patent

UNITED STATES PATENTS

| | | |
|---|---|---|
| 2,354,916 | Hurt | Aug. 1, 1944 |
| 2,700,632 | Ackerlind | Jan. 25, 1955 |
| 2,849,299 | Young | Aug. 26, 1958 |
| 2,855,664 | Griffith et al. | Oct. 14, 1958 |
| 2,978,376 | Hulse | Apr. 4, 1961 |
| 2,984,056 | Scholl | May 16, 1961 |
| 2,988,809 | Hall | June 20, 1961 |
| 3,001,582 | Kindseth et al. | Sept. 26, 1961 |